March 8, 1949.
F. A. TEAGUE
2,464,005
PROCESS AND APPARATUS FOR SEPARATING MEAT
FROM SHELL FRAGMENTS OF CRACKED NUTS
Filed May 26, 1945
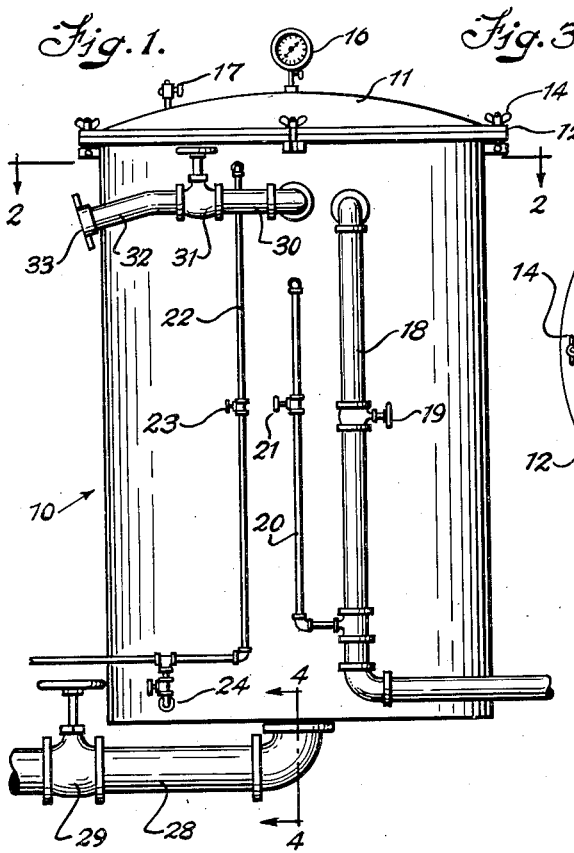
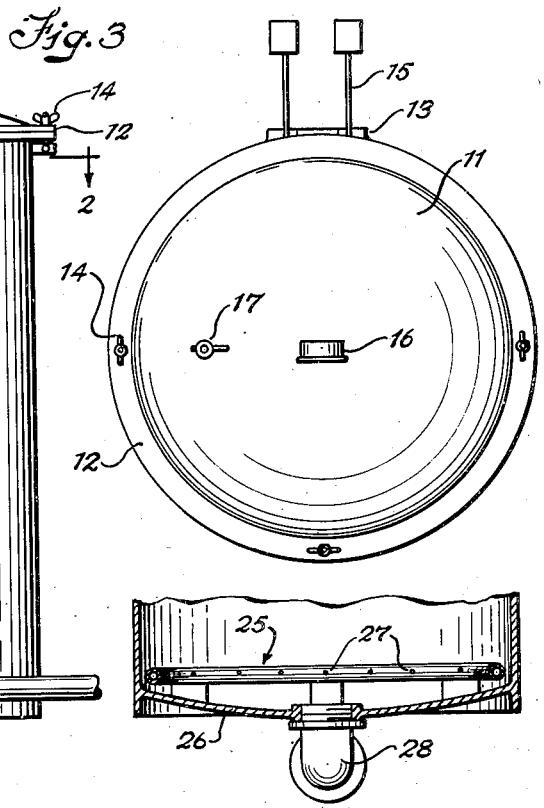
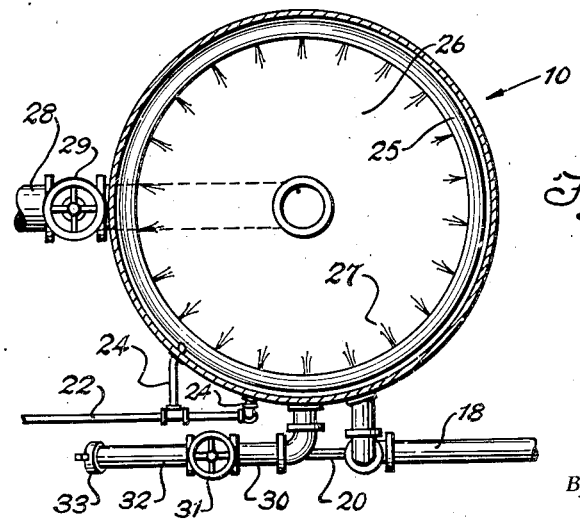
Inventor
Frank A. Teague.
By Clarence A. O'Brien
and Harvey B. Jacobson
Attorneys Patented Mar. 8, 1949

2,464,005

UNITED STATES PATENT OFFICE 2,464,005

PROCESS AND APPARATUS FOR SEPARATING MEAT FROM SHELL FRAGMENTS OF CRACKED NUTS

Frank A. Teague, Albany, Ga.

Application May 26, 1945, Serial No. 595,930

13 Claims. (Cl. 146—222)

My invention has for its object the cleaning of cracked nuts or salvaging the nut-meat from already cracked shells. More particularly, it relates to shelling of pecan nuts and removing the pecan nut meat from the shells which still remains after the cracked nuts have been run through various machines and from 10% to 25% of the meat still remains on the shell mixed in among the shells. Such remaining meat usually ranges in size from granules to fairly large pieces. To salvage these small pieces handpicking is out of the question, being too costly and thus practically prohibitive as eating up the profits.

For this reason, I have found that the salvaging can be profitably performed by the use of this pressure method at a small fraction of the hand-picking cost and that 90% to 95% of the shell fragments can be eliminated, before the meat goes to the packing tables for final inspection.

The pecan shells are porous and for that reason will float in water together with the meat. If now the shell can be made to sink, leaving the meat floating, then the salvaging of the latter becomes very simple. This fact is made use of in my process, which will now be described with the aid of the accompanying drawing illustrating one embodiment of the invention and wherein Figure 1 represents a side elevation of a suitable vessel or retort;

Figure 2 is a horizontal section along line 2—2 of Figure 1;

Figure 3 is a top plan view of the vessel or retort shown in Figures 2 and 4, and Figure 4 is a fragmentary vertical section along line 4—4 of Figure 1 and looking to the left.

In the different figures, the same reference characters refer to the same details.

Reference numeral 10 represents an upright vessel or retort of suitable size, such as about 48" diameter and 72" deep, and provided with a tight fitting lid or cover 11, preferably dome-shaped and having a circumferential flange 12 fitting a similar flange around the top edge of the vessel 10 with suitable sealing means interposed, bolts and wing nuts 14, being supplied for holding the lid down air-tight. Since this lid 11 is quite heavy, it is preferably hinged as at 13 and counterbalanced by weighted arms 15. An air pressure gauge 16 is shown in its center and a "bleeder" valve at 17.

The retort or vessel 10 is provided with a main water supply pipe 18 with a valve 19 and opening into the vessel 10 about 18 inches from the top. This pipe 18 has a diameter, about 2½ inches, and a smaller branch pipe 20 of ¾ inches diameter opening into the vessel 10 a few inches lower than the main waterpipe 18, and it is also provided with a valve 21.

Numeral 22 represents a ½ inch pipe line for compressed air which opens into the vessel 10 higher up than the inlet from the water pipe 18. A valve 23 is provided on the compressed air pipe 22. All three of these pipe lines are vertical and suitably secured to the outside of the vessel 10. At the bottom end of the air pipe 22 is shown a branch 24 which connects through the side wall of the vessel with a circular air pipe or ring 25 resting on the bottom plate 26, which is conical and deeper at its center than at the walls of the vessel 10. This ring 25 has a number of small, drilled holes 27, about $\frac{1}{32}$ inch diameter and spaced about 6 inches apart, being radially, inwardly directed around its circumference, see Figure 2.

In the depressed center of the bottom plate 26 a drainpipe 28 opens, and has a gate valve 29 being suitably of 6 inches diameter or more. The conical bottom 26 aids in collecting the shell fragments over the outlet to the drainpipe 28.

Finally, near the top of the vessel 10, slightly above the inlet from the waterpipe 18, is shown an overflow or outlet pipe 30, about 3 inches in diameter, also valved as at 31 and terminating with a nipple 32, bent slightly downwards and having a closure 33 in the shape of a winged cap.

The shelling process of this invention is the following:

The vessel or retort 10 is first filled with water to within about 18 inches from the top, that is, to the inlet from the waterpipe 18 by opening valve 19, all other valves being closed.

After then closing valve 19, four or five sacks of salvage stack of the pecan or other nuts are poured into the vessel and the lid 11 fastened down by applying the wing nuts 14 tightly. The valve 21 may then be opened for a short time to insure that the vessel is completely filled and then the valve is closed.

The next step is now to open air valve 23 to supply air pressure until gauge 16 indicates an air pressure of 20 pounds per square inch and hold it at that pressure for half a minute, then increase to 30 pounds and hold this for about another half minute; then slowly increase the pressure to 40 or 50 pounds and hold it 3 to 5 minutes. In this manner, the slowly increased pressure will give the shells a chance to sink without trapping any meat.

The next step is to reduce the pressure slowly by the aid of the bleeder valve 17. This is to prevent a sudden drop of pressure, which would have the tendency to pull the shells back to the surface again before all oxygen has been exhausted.

In the following step, after air pressure has been released, the lid 11 is raised, the cap 33 removed and valve 31 opened and water admitted by opening valve 21, thereby permitting the salvaged meat floating on top to flow off through spout 32 to be collected.

Then when the nut meat has been removed from the surface, a few shots of air is injected as spray at the vessel's bottom through the jets 25 by opening air valve 24. This will loosen shells to permit nut meat to rise to the surface to be salvaged as before through spout 32.

The principle of the process thus described is that the shells of the cracked pecan nuts or other similar nuts are forced down to the bottom of the retort through the water by air pressure. This pressure causes the oxygen contained in the shell to be exhausted, the shell is then held under the water by its own weight and will remain there. The meat, being much lighter will rise to the surface and will then be dipped or drained off. When all nut meat has been removed valves 19 and 29 are opened to flush the retort and carry off empty shell fragments through drainpipe 28.

The process can be repeated several times or until the retort becomes practically full of shell. With the size retort used in my experiments about 10 bags of salvage stock could be used before taking empty shell from the retort.

It is to be understood that the invention as here disclosed is not limited to the details here described and shown but that the same may be varied without departing from the spirit of the invention as defined by the subjoined claims.

I claim:

1. An apparatus for separating shell fragments from nut meat of cracked nuts, comprising an upright open-top vessel, a tight fitting lid therefor, means for admitting water near the top of the vessel, means admitting compressed air at the top and by jet-spray at bottom of the vessel, a valved salvage spout for nut meat below said lid and a valved drainpipe at the bottom of the vessel for removing shell fragments, said air and water admitting means being valved for selectively regulating amount of water and air pressure.

2. An apparatus for separating shell fragments from nut meat of cracked nuts, comprising an upright open top vessel, a tight fitting lid therefor, means for admitting water near the top of the vessel, means admitting compressed air at the top and by jet-spray at bottom of the vessel, a valved salvage spout for nut meat below said lid and a valved drainpipe at the bottom of the vessel for removing shell fragments, said air and water admitting means being valved for selectively regulating amount of water and air pressure, said jet-spray means comprising a perforated ring fitting over the vessel's bottom having a series of small radially inwardly directed apertures, said bottom being deeper at its center where said drainpipe opens, thereby facilitating removal of shell fragments.

3. An apparatus for separating shell fragments from nut meat of cracked nuts, comprising an upright open top vessel, a tight fitting lid therefor, means for admitting water near the top of the vessel, means admitting compressed air at the top and by jet-spray at bottom of the vessel, a valved salvage spout for nut meat below said lid and a valved drainpipe at the bottom of the vessel for removing shell fragments, said air and water admitting means being valved for selectively regulating the amount of water and air pressure, and sealing means between the lid and the vessel.

4. An apparatus for separating shell fragments from nut meat of cracked nuts, comprising an upright open top vessel, a tight fitting lid therefor, means for admitting water near the top of the vessel, means admitting compressed air at the top and by jet-spray at bottom of the vessel, a valved salvage spout for nut meat below said lid and a valved drainpipe at the bottom of the vessel for removing shell fragments, said air and water admitting means being valved for selectively regulating the amount of water and air pressure, a pressure gauge and a bleeder valve on said lid.

5. An apparatus for separating shell fragments from nut meat of cracked nuts, comprising an upright open top vessel, a tight fitting lid therefor, means for admitting water near the top of the vessel, means admitting compressed air at the top and by jet-spray at bottom of the vessel, a valved salvage spout for nut meat with a downwardly bent nipple below said lid and a valved drainpipe at the bottom of the vessel for removing shell fragments, said air and water admitting means being valved for selectively regulating amount of water and air pressure.

6. An apparatus for separating shell fragments from nut meat of cracked nuts, comprising an upright open top vessel, a tight fitting lid therefor, means for admitting water near the top of the vessel, means admitting compressed air at the top and by jet-spray at bottom of the vessel, a valved salvage spout for nut meat below said lid and a valved drainpipe at the bottom of the vessel for removing shell fragments, said air and water admitting means being valved for selectively regulating the amount of water and air pressure, sealing means between the lid and the vessel, said jet-spray means comprising a perforated ring fitting over the vessel's bottom having a series of small radially inwardly directed apertures, said bottom being deeper at its center where said drainpipe opens, thereby facilitating removal of shell fragments.

7. Process for salvaging nut meat from cracked nuts, which consists in depositing cracked nuts in a water-filled sealed container, subjecting the thus soaked cracked nuts to an air pressure of about 20 pounds per square inch for about one-half minute, then increasing said pressure to 30 pounds for another half minute; thereupon slowly increasing the pressure to a maximum of 45 pounds and retaining said high pressure during 3 to 5 minutes, thereafter slowly reducing the pressure, thereby to increase the weight of the porous shell fragments causing them to separate from the lighter meat and sink to the bottom of the container, then opening the container and salvaging the floating meat by drawing the same off with the water at the top of the container while retaining the water level therein.

8. Process for salvaging nut meat from cracked nuts, which consists in depositing cracked nuts in a water-filled sealed container, subjecting the thus soaked cracked nuts to an air pressure of about 20 pounds per square inch for about one-half minute, then increasing said pressure to 30 pounds for another half minute; thereupon slowly increasing the pressure to a maximum of 45 pounds and retaining said high pressure during 3 to 5 minutes, thereafter slowly reducing the pressure, thereby to increase the weight of the porous shell fragments causing them to separate from the lighter meat and sink to the bottom of the container, then opening the container and salvaging the floating meat by running off the water and floating meat at the top while retaining the water level therein by admitting a replacing supply of water to the container for the water being run off, lastly draining the container thereby removing the empty shell fragments from the bottom of the container.

9. An apparatus for separating shell fragments from nut meat of cracked nuts, comprising an upright open-top vessel, a tight fitting lid therefor, means for admitting water to the vessel, means admitting compressed air to the vessel at the top, means connected to the last named means for admitting air to the vessel at the bottom radially inwardly at a plurality of spaced points from adjacent the inner surface of the vessel, a valved salvage spout for nut meats below said lid and leading angularly downwardly, means for closing the free end of said spout, and a valved drain pipe of large dimensions leading from the bottom of the vessel at the center for removing shell fragments, said bottom dipping downwardly in spaced relation below the bottom air admitting means, said air and water admitting means being valved for selectively regulating the amount of water and air pressure admitted.

10. Process for salvaging nut meat from cracked nuts which consists in depositing the cracked nuts in a water filled sealed container, subjecting the thus soaked cracked nuts to an air pressure admitted at the top of the container for a short period, then increasing said pressure for a similar short period, thereupon slowly increasing the pressure to a maximum higher pressure and retaining said high pressure for a longer period, thereafter slowly reducing the pressure thereby to increase the weight of the porous shell fragments causing them to separate from the lighter meat and sink to the bottom of the container, then opening the container and salvaging the floating meat while retaining the water level therein, admitting air pressure in a spray over a large area at the bottom of the container to loosen the shells and causing remaining nut meat to rise to the surface of the water to be salvaged and lastly draining the container at the bottom thereby removing the empty shell fragments from the bottom of the container.

11. Process for salvaging nut meats from cracked nuts which consists in depositing the cracked nuts in a water filled sealed container, subjecting the thus soaked cracked nuts to an air pressure admitted at the top of the container for a short period, then increasing said pressure for a similar short period, thereupon slowly increasing the pressure to a maximum higher pressure and retaining said high pressure for a longer period, thereafter slowly reducing the pressure thereby to increase the weight of the porous shell fragments causing them to separate from the lighter meat and sink to the bottom of the container, then opening the container and salvaging the floating meat by overflow with the water at the top while retaining the water level therein by replenishing the water drawn off by overflow, admitting air pressure in a spray over a large area at the bottom of the container to loosen the shells and causing remaining nut meats to rise to the surface of the water to be salvaged and lastly draining the container at the bottom thereby removing the empty shell fragments from the bottom of the container.

12. The process of salvaging nut meats from cracked nuts which consists in depositing the cracked nuts in a water filled sealed container, subjecting the thus soaked cracked nuts to air pressure above atmospheric admitted at the top of the container and progressively increasing said pressure to a maximum higher pressure of between forty and fifty pounds per square inch for a short period, thereafter slowly reducing the pressure thereby to increase the weight of the porous shell fragments causing them to separate from the lighter meat and sink to the bottom of the container, then opening the container and admitting more water to the container to cause the floating meat to rise with the water and floating meat at the top and flowing off the water and floating meat at the top to be strained and collected.

13. The process of salvaging nut meats from cracked nuts which consists in depositing the cracked nuts in a water filled sealed container, subjecting the thus soaked cracked nuts to air pressure above atmospheric admitted at the top of the container and progressively increasing said pressure to a maximum higher pressure of between forty and fifty pounds per square inch for a short period, thereafter slowly reducing the pressure thereby to increase the weight of the porous shell fragments causing them to separate from the lighter meat and sink to the bottom of the container, then opening the container and running off the water and floating meat at the top to collect the meat by straining while admitting more water to the container to cause the floating meat to rise to the top with the water, injecting air into the water at the bottom to loosen and separate the shells from the nut meats remaining in the container to permit the nut meat to rise to the surface and run off with the water as before at the top as overflow, and then draining the container at the bottom to remove the empty shell fragments remaining in the container.

FRANK A. TEAGUE.

REFERENCES CITED

The following references are of record in the file of this patent:

UNITED STATES PATENTS

| Number | Name | Date |
| --- | --- | --- |
| 1,872,548 | Lowen | Aug. 16, 1932 |
| 2,216,050 | Romberg | Sept. 24, 1940 |
| 2,225,459 | Palmrose | Dec. 17, 1940 |
| 2,241,737 | Romberg | May 13, 1941 |
| 2,314,962 | Wood | Mar. 30, 1943 |
| 2,318,265 | Stagmeier | May 4, 1943 |

FOREIGN PATENTS

| Number | Country | Date |
| --- | --- | --- |
| 14,327 | Great Britain | Oct. 19, 1852 |